United States Patent [19]

Bjerke et al.

[11] 3,792,268

[45] Feb. 12, 1974

[54] DOCUMENT SCANNER HAVING OPTICAL DIFFUSION MEANS

[75] Inventors: Brian Kenneth Bjerke; Michael McHugh Siverling, both of Rochester, Minn.

[73] Assignee: International Business Machines Corporation, Armonk, N.Y.

[22] Filed: Jan. 6, 1972

[21] Appl. No.: 215,868

[52] U.S. Cl. ............. 250/219 Q, 250/216, 250/222, 356/209

[51] Int. Cl. ............................................. G08c 9/06

[58] Field of Search 250/219 DC, 223 B, 216, 219 Q, 250/219 WE, 219 DF, 216, 221, 222; 209/DIG. 2; 356/71, 209, 210, 237, 238

[56] References Cited

UNITED STATES PATENTS

| | | | |
|---|---|---|---|
| 3,536,927 | 10/1970 | Mink | 250/219 DQ X |
| 3,235,740 | 2/1966 | Rottmann | 250/223 B X |
| 1,831,796 | 11/1931 | Capstaff | 250/216 X |
| 3,581,100 | 5/1971 | Milford | 250/216 |

OTHER PUBLICATIONS

Giedd, et al., IMB Technical Disclosure Bulletin, Vol. 13, No. 5, Oct. 1970, pp. 1062, 1063.

*Primary Examiner*—Walter Stolwein
*Attorney, Agent, or Firm*—J. Michael Anglin

[57] ABSTRACT

An illumination provides incident radiation to a document lying in an object plane. A photodetector converts nonspecular reflections from the plane into an electrical signal. To prevent unwanted specular reflections, from plastic mail-piece windows or uneven documents, for degrading the signal-to-noise ratio, an optical diffuser is located adjacent the object plane. Both the incident and the reflected radiation pass through the diffuser, which may be a ground-glass flat.

14 Claims, 3 Drawing Figures

PATENTED FEB 12 1974 3,792,268

PRIOR ART

DOCUMENT SCANNER HAVING OPTICAL DIFFUSION MEANS

BACKGROUND OF THE INVENTION

The present invention pertains to scanners for converting data from documents or other objects into an electrical signal. Such scanners are useful in, for instance, character-recognition systems, mark-sensing apparatus and facsimile transmitters.

Taking as an example the reading of printed characters on a document such as a sheet of paper or a letter-mail piece, it is known that most documents and printing inks have approximately the same optical reflectance at specular angles. Therefore, it is common practice to detect only diffuse or nonspecular reflections from the document. This may be accomplished by focusing an illumination source along a first axis onto the document. A photodetector is then aimed at the illuminated area along a second axis. If the two axes form unequal angles with the plane of the document, specular reflections will not reach the detector. Either the illumination source or the detector may be focussed into one or more spots or lines on the document.

Scanners of the above type perform well when the scanner has an unobstructed view of a flat surface in a document or object plane. A significant difficulty arises, however, in the reading of objects, such as mail pieces, which have transparent or translucent windows overlying the actual printing to be read. Since it is virtually impossible to cause such windows to lie absolutely flat in an optical scanner, large and variable amounts of light are specularly reflected therefrom into the photodetector. This effect occurs even with thin, translucent windows through which printing is easily intelligible by human readers. The specular reflections resulting from such "window mail" are so severe that present character-recognition machines are able to read complete addresses infrequently at best. Since window mail comprises a signigicant percentage of all mail pieces in the United States, this problem is in fact one of the most important obstacles to be overcome in providing a practical system for automated mail handling.

The problem of specular reflections is also important for other types of documents which are read by optical scanners. Documents of the "turn-around" type, for instance, are usually relatively thin; hence, they are prone to arrive at the scanner in a crumpled, dog-eared and torn condition. The usual method of eliminating undesirable specular reflections from these documents is to employ a mechanical document flattener at the read station. Such flatteners add expense to the scanner, sometimes cause jams in document feeding, and may themselves add distortions or damage to the document.

Another, but unrelated, difficulty in certain scanners involves a safety hazard to operating personnel from the high energy densities present in laser beams and other highly collimated beams used in flying-spot and line scanners. A collimated beam from even a one milliwatt laser, for instance, is capable of producing retinal damage at considerable distances. At higher powers, there is the danger of heat damage or fire to materials in the path of the beam. Future restrictions upon the use of lasers in office or business environments may make it impossible to operate laser scanners except where the beam is inaccessible to operating personnel. The widespread use of laser scanners, however, requires that the machine containing the scanner be placed in a relatively uncontrolled environment, and that the complete document path be easily accessible for the clearing of jams and for other purposes.

SUMMARY OF THE INVENTION

It is therefore an object of the present invention to avoid the transmission of undesired specular reflections to the photodetector of an optical scanner.

Another object of the invention is to provide an optical scanner capable of reading documents through transparent or translucent coverings, such as are commonly found on mail pieces.

A further object of the invention is to reduce or eliminate the need for document flatteners in optical scanners.

Still a further object is to enhance the safety of scanners using highly concentrated beams of radiant energy.

The above and other objects are achieved in a scanner having one or more sources of illumination for providing incident radiation to an object or document plane, and having one or more photodetectors, positioned to receive diffuse reflections from the object plane, for converting the reflected radiation into an equivalent electrical signal for further processing. An optical diffuser, such as a translucent ground-glass flat, is positioned adjacent the object plane so as to intercept both the incident radiation from the source and the reflected radiation from the document. The diffuser may be mounted substantially in contact with the object plane, as will be explained hereinafter.

A greater understanding of the invention, as well as objects, advantages and modifications within the spirit and scope thereof, may be obtained from the following detailed description, taken in conjunction with the accompanying drawings.

DRAWINGS

DETAILED DESCRIPTION

Figure 1:
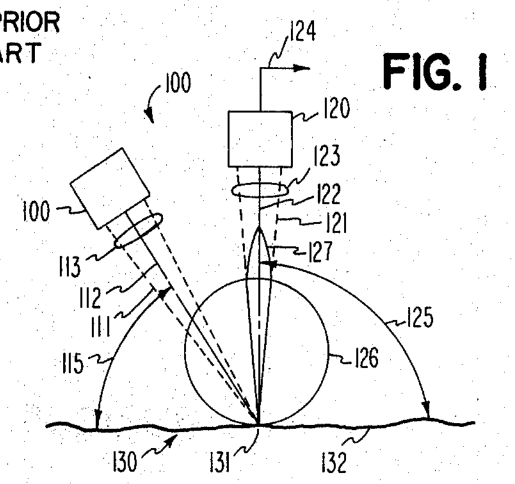
FIG. 1 is a stylized view of a prior-art scanner useful in explaining the present invention.

FIG. 1 shows a stylized form of a conventional scanner 100 arranged to minimize specular reflections. Illumination source 110 produces a beam of radiation 111 along a first axis 112. The radiation in beam 111 may be of any form or wavelength suitable to the particular application desired. For purposes of illustration, it will be assumed that the beam contains optical radiation in the near infrared range. Beam 111 may be focussed or collimated into a spot, line or other desired area by lens 113. Other types of beam-directing means well known in the art may also be employed; it may alternatively be desirable in some cases to employ a large-area illuminator 110, or even ambient illumination.

Photodetector 120 receives reflected radiation 121 along an axis 122. Detector 120 may be focussed into any desired configuration along axis 122 by a lens 123 or other conventional directing means. In some applications, means 123 may be dispensed with. Detector 120 may be a single small-area or large-area photodetector, or it may contain an array of individual detector elements. Detector 120 produces one or more electrical signals on line 124 related to the intensity of the radiation in beam 121.

Axes 112 and 122 intersect an area 131 on an object or document plane 130. Although the size and shape of area 131 is arbitrary, it is frequently a spot or a line, that is, an area having a relatively small extent in at least one dimension of object plane 130. Plane 130 is shown containing a document 132 which is relatively flat and which extends into the page of FIG. 1. Other shapes are also useful, however; in a drum scanner, for instance, plane 130 may be the surface of a cylinder about which document 132 is wrapped. The word "plane", then, must be taken in a broad sense to include any geometric configuration or surface adapted to the particular optical components chosen for a given application.

The transmission of specular rays from document 132 into detector 120 is commonly avoided by making angle 115, between source axis 112 and object plane 130, unequal to angle 125, between detector axis 122 and plane 130. Then, if document 132 were perfectly flat in plane 130, the diffuse reflections of beam 111 for various angles would appear as shown in curve 126, in polar coordinates. But, when document 132 is wrinkled or uneven as shown in FIG. 1, frequent bursts of specular reflections 127 are directed along axis 122. Such bursts completely swamp the desired video signal appearing on line 124, since document backgrounds and most inks have approximately the same reflectance at specular angles. If document 132 is a mail piece having a transparent or translucent plastic window for revealing the address printed on an enclosed sheet, curve 126 may represent the diffuse reflections from the sheet, while curve 127 may indicate the added reflections caused by the window.

It may thus be appreciated that the level of the desired reflections reaching detector 120 may be well below the large, widely variable and unpredictable noise caused by specular reflections from the window. Even those windows which appear visually to be flat and glare-free are capable of disrupting the operation of conventional scanners.

Figure 2:
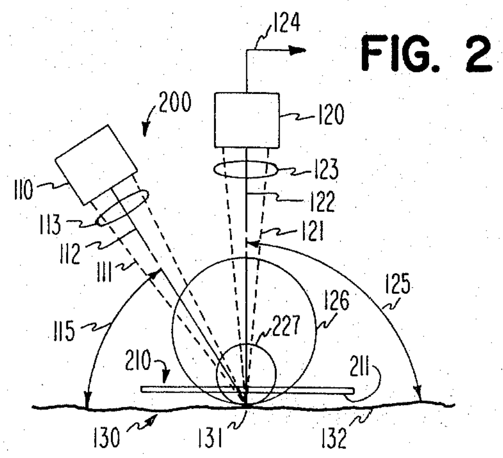
FIG. 2 is a stylized representation of a basic form of the invention.

FIG. 2 shows a scanner 200 according to the present invention. Reference numbers of corresponding components from FIG. 1 are duplicated in FIG. 2. Generally speaking, it has been found that undesirable specular reflections from document 132 may be considerably reduced by the deceptively simple expedient of placing an optical diffuser 210 adjacent object plane 130, in the path of both the incident radiation 111 and the reflected radiation 121.

The nature and form of diffuser 210 appears to be noncritical, as long as it capable of diffusing the wavelength of the radiation employed, and as long as it is large enough to intercept both the incident rays 111 and the reflected rays 121 at all desired positions of area 131. Diffuser 210 may conveniently be, for instance, a thin, flat sheet of glass having the surface 211, nearest plane 130, ground by a suitable abrasive agent. Although its orientation with respect to object plane 130 appears to be unimportant, diffuser 210 must be located sufficiently close or adjacent to plane 130 that it will not significantly affect the scanner's resolution; that is, so that it will not significantly increase the apparent size of the smallest area which is desired to be separated from adjacent areas. For scanners producing a line or spot of illumination, this may also be stated as requiring that the illuminated area has a substantially constant size on document 132, whether diffuser 210 is present or absent in the scanner. For scanners of practical dimensions, it may be said that diffuser 210 should preferably be located less than approximately three or four millimeters from the surface of document 132. Surface 211 of diffuser 210 may in fact be substantially in contact with document 132. Since document 132 may be uneven, "contact" must be taken to include contact with the higher projections of the document, as well as complete or continuous contact between the document and the diffuser. Mechanical pressure to force a more complete contact may be used, but it does not significantly improve the performance of scanner 200. Although the exact mode of operation may not be completely understood, it is believed that diffuser 210, when placed as shown in scanner 200, diffuses the specular reflections from document 132 into a pattern 227 which has a relatively low level along detector axis 122, while passing the already diffuse reflections 126 relatively unchanged, both in magnitude and angular distribution. That is, reflections 127 have a high level at the specular angle, but have a relatively low total energy content; diffuser 210 spreads this energy over a much wider angular range, thereby considerably reducing its level along axis 122.

Over and above its advantages in reducing undesired specular reflections, diffuser 210 minimizes safety hazards to operating personnel. Suppose that source 110 is a laser or other device which produces a highly concentrated optical beam 111. If no document is present in object plane 130 of scanner 100, FIG. 1, then beam 111 may be transmitted for considerable distances without significant decrease in energy density. In scanner 200, however, diffuser 210 rapidly disperses beam 111 at distances beyond object plane 130. At the power levels usually employed in optical scanning, beam 111 will be spread to entirely safe energy-density levels at distances of less than a centimeter or so. This signifies that retinal damage (the principal hazard at scanner power levels) may be avoided even when an operator looks directly into the scanner at very close range. The dangerous portions of beam 111 may be made inaccessible by enclosing source 110 (as well as detector 120 if desired) in a sealed enclosure having diffuser 210 as a window.

Figure 3:
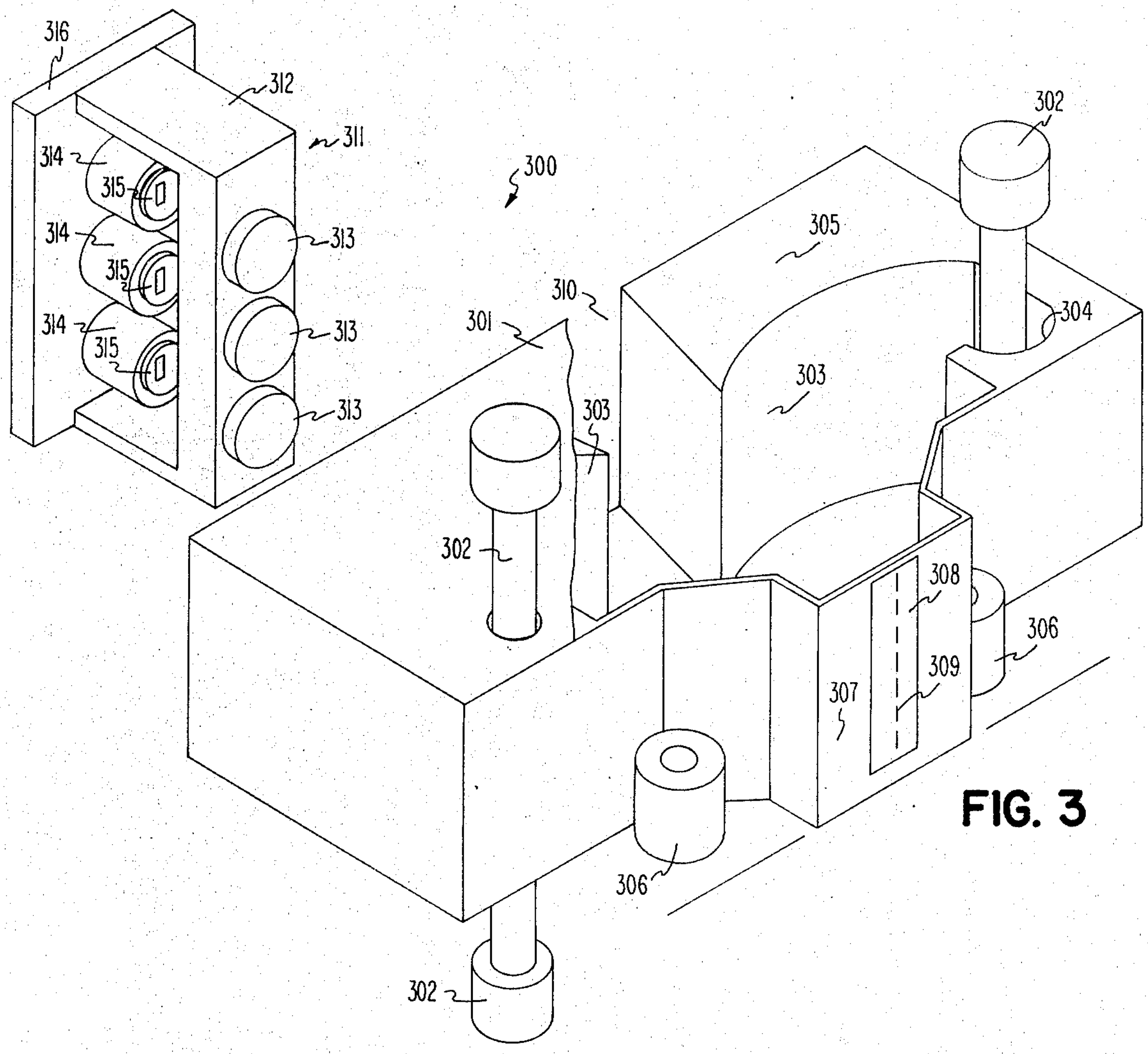
FIG. 3 illustrates a complete scanner assembly incorporating the invention.

FIG. 3 shows the present invention as incorporated into a scanner 300 designed for finding addresses on letter-mail pieces. Illuminator housing 301, shown partially broken away, provides mountings for four high-power tungsten-halogen lamps 302. Lamps 302 are positioned at one focus of elliptical mirrors 303, while cylindrical mirrors 304 scavenge otherwise wasted illumination, returning it through lamps 302 to mirrors 303. Mirrors 303 and 304 are dichroic, reflecting only that radiation in a broad range centered in the near infrared, at about 1,100 nanometers. Other wavelengths are transmitted to air-cooled heat exchanger blocks 305.

Mail pieces to be scanned are driven by conventional vacuum rollers 306 past a vertical front surface 307 of housing 301. Roller placement is such that the mail pieces are in substantial contact with surface 307, but insufficient pressure is applied to force the mail pieces into complete or continuous contact. Surface 307 has a rectangular window in which is mounted a thin ground-glass diffuser 308. The outside surface of diffuser 308 is located in the plane of one focus of both elliptical mirrors 303, so that an intense beam of illumination appears along a narrow line as indicated at 309. Diffuse reflections from the mail piece (or other document) pass back through diffuser 308 and through an aperture 310 to photodetector assembly 311. A bracket 312 carries three lenses 313 for focussing the reflected radiation from the upper, middle and lower portions of line 309 onto three linear photodetector arrays 314. Each detector element is capable of resolving a spot approximately 0.38 mm. in diameter at the position of line 309, and converts the radiation intensity into an equivalent electrical signal. All three arrays, taken together, cover a length of about 7.6 cm., referenced to line 309. The signals from each element may be fed out in parallel, or may be multiplexed by well-known techniques. Each array 314 may be fitted with an optical filter 315 for narrowing the relatively broad spectrum of the reflected radiation.

Arrays 314 are mounted on a backplate 316 which is held in a predetermined relationship to scanner housing 301 by conventional means (not shown). It will be noted that the "detector axis" of scanner 300 is actually a large number of coplanar lines extending between line 309 and arrays 314, rather than the single line 122 shown in FIG. 2. Similarly, the "illuminator axis" of scanner 300 comprises a large number of vertical planes drawn between lamps 302, elliptical mirrors 303, cylindrical mirrors 304, and line 309, rather than the single line 112 of FIG. 2. Although these planes intersect line 309 at various angles to the plane of housing surface 307, the configuration of scanner 300 is such that any line drawn from a mirror 303 to line 309 forms an angle with surface 307 which is unequal to the angle between surface 307 and any line drawn from line 309 to a detector array 314. Therefore, only diffuse reflections will be received by arrays 314 if the mail piece is perfectly flat. Specular reflections from uneven documents or address windows, which would otherwise be transmitted to arrays 314, are effectively dispersed by diffuser 308. A diffuser made from a transparent flat having a ground outer surface, besides having the optical and safety advantages referred to hereinabove, has an additional advantage in that it permits sealing the housing 301 against dirt and dust from the document path, while abrasions of the mail pieces against diffuser 308 do not degrade its desirable optical qualities.

We claim as our invention:

1. A scanner for an information bearing document positioned substantially in a document plane, said scanner comprising:

illumination source means for providing incident radiation to said document in said plane;

detector means for receiving radiation reflected from said document and for converting said reflected radiation to an electrical signal representative of the intensity of said reflected radiation; and diffusion means mounted on said scanner and disposed adjacent said document plane so as to intercept both said incident radiation and said reflected radiation.

2. A scanner according to claim 1, wherein said radiation is optical radiation.

3. A scanner according to claim 2, further comprising means for directing said incident radiation along a predetermined axis so as to produce in said document plane an illuminated area having a small extent in at least one dimension of said plane.

4. A scanner according to claim 3, wherein said illuminated area has the shape of a line.

5. A scanner according to claim 3, wherein said illuminated area has the shape of a spot.

6. A scanner according to claim 3, wherein said diffusion means is disposed with respect to said source means and said document plane such that said illuminated area is substantially constant both in the presence and absence of said diffusion means.

7. A scanner according to claim 6, wherein said diffusion means is disposed such that said indident radiation is substantially dispersed at distances beyond said document plane.

8. A scanner according to claim 3, wherein said diffusion means is substantially in contact with said document.

9. A scanner according to claim 2, further comprising means for directing said reflected radiation to said detector means along along a predetermined axis.

10. A scanner according to claim 9, wherein said axis is substantially perpendicular to said document plane.

11. A scanner according to claim 9, further comprising means for directing said incident radiation along a further predetermined axis so as to produce an illuminated area in said document plane, said axes defining unequal angles with said document plane.

12. A scanner according to claim 2, wherein said diffusion means comprises a sheet of translucent material.

13. A scanner according to claim 12, wherein said diffusion means comprises a substantially flat sheet of glass having a ground surface.

14. A scanner according to claim 13, wherein said ground surface is disposed adjacent said document plane.

* * * * *